US012658054B2

(12) United States Patent
Wei

(10) Patent No.: US 12,658,054 B2
(45) Date of Patent: Jun. 16, 2026

(54) DETERMINATION METHOD AND DETERMINATION DEVICE FOR VEHICLE TRAFFIC EFFICIENCY, AND VEHICLE

(71) Applicant: Momenta (Suzhou) Technology Co., Ltd., Suzhou (CN)

(72) Inventor: Shujun Wei, Suzhou (CN)

(73) Assignee: Momenta (Suzhou) Technology Co., LTD., Suzhou (CN)

( * ) Notice: Subject to any disclaimer, the term of this patent is extended or adjusted under 35 U.S.C. 154(b) by 207 days.

(21) Appl. No.: 18/390,160

(22) Filed: Dec. 20, 2023

(65) Prior Publication Data

US 2024/0290208 A1 Aug. 29, 2024

Related U.S. Application Data

(63) Continuation of application No. PCT/CN2023/087844, filed on Apr. 12, 2023.

(30) Foreign Application Priority Data

Feb. 27, 2023 (CN) ......................... 202310171819.3

(51) Int. Cl.
*G08G 1/00* (2006.01)
*G08G 1/01* (2006.01)
(Continued)

(52) U.S. Cl.
CPC ........... *G08G 1/167* (2013.01); *G08G 1/0125* (2013.01); *G08G 1/0145* (2013.01); *G08G 1/096725* (2013.01); *G08G 1/166* (2013.01)

(58) Field of Classification Search
CPC .... G08G 1/167; G08G 1/0125; G08G 1/0145; G08G 1/096725; G08G 1/166
See application file for complete search history.

(56) References Cited

U.S. PATENT DOCUMENTS 8,155,868 B1 * 4/2012 Xing .................... G07C 5/0808 340/439
11,097,735 B1 * 8/2021 Marasigan ............. G08G 1/164
(Continued)

FOREIGN PATENT DOCUMENTS

CN 112389427 A 2/2021
CN 112455445 A 3/2021
(Continued)

OTHER PUBLICATIONS

International Search Report for Corresponding International Application No. PCT/CN2023/087844, 5 pages.

*Primary Examiner* — Truc M Do
(74) *Attorney, Agent, or Firm* — Dinsmore & Shohl LLP

(57) ABSTRACT

Provided are a determination method and a determination device for vehicle traffic efficiency, and a vehicle. The method includes: determining obstacle vehicles in lanes corresponding to a traveling vehicle, the obstacle vehicles including a same-lane leading vehicle and a different-lane leading vehicle of the traveling vehicle; determining a vehicle block cost parameter based on a first velocity of the traveling vehicle and a second velocity of the same-lane leading vehicle, and obtaining an obstacle block cost parameter of the different-lane leading vehicle; and determining lane traffic efficiency based on the vehicle block cost parameter, the obstacle block cost parameter, and a block weight coefficient, so as to select, based on the lane traffic efficiency, a lane for vehicle lane changing, the lane traffic efficiency representing an expected smooth traffic condition when the traveling vehicle enters a lane.

14 Claims, 6 Drawing Sheets

(51) Int. Cl.
*G08G 1/0967* (2006.01)
*G08G 1/16* (2006.01)

(56) References Cited

U.S. PATENT DOCUMENTS

| | | | | |
|---|---|---|---|---|
| 2014/0207325 | A1* | 7/2014 | Mudalige | B62D 15/0255 701/25 |
| 2019/0061765 | A1* | 2/2019 | Marden | B60W 30/18163 |
| 2020/0265710 | A1* | 8/2020 | Zhan | B60W 60/00274 |
| 2020/0310428 | A1* | 10/2020 | Li | G05D 1/0088 |
| 2021/0114617 | A1* | 4/2021 | Phillips | G01C 21/3453 |
| 2021/0370978 | A1* | 12/2021 | Molinari | B60W 60/0011 |
| 2022/0176995 | A1* | 6/2022 | Subramanian | B60W 30/08 |

FOREIGN PATENT DOCUMENTS

| | | | |
|---|---|---|---|
| CN | 113771881 | A | 12/2021 |
| CN | 113844451 | A | 12/2021 |
| CN | 114506342 | A | 5/2022 |
| CN | 115257811 | A | 11/2022 |
| CN | 115402318 | A | 11/2022 |
| CN | 115571130 | A | 1/2023 |
| KR | 20200132652 | A | 11/2020 |

* cited by examiner

DETERMINATION METHOD AND DETERMINATION DEVICE FOR VEHICLE TRAFFIC EFFICIENCY, AND VEHICLE

CROSS-REFERENCE TO RELATED APPLICATIONS

This application is a continuation of International Application No. PCT/CN2023/087844, filed on Apr. 12, 2023, which claims priority to Chinese Patent Application No. 202310171819.3, filed on Feb. 27, 2023. The disclosures of the aforementioned applications are hereby incorporated by reference in their entireties.

TECHNICAL FIELD

The present disclosure relates to the technical field of intelligent driving, and in particular, to a determination method and a determination device for vehicle traffic efficiency, and a vehicle.

BACKGROUND

With the rapid development of intelligent driving technology, the control over a vehicle traveling process is becoming more and more refined. A vehicle generally has a lane change during the traveling to meet different traveling planning requirements.

At present, an existing vehicle lane change intention is generally determined based on machine learning algorithm for intelligent prediction. After the vehicle lane change intention is determined, vehicle lane changing planning is performed. For example, sensing information, map information, vehicle state information, and the like are taken as input parameters of the machine learning algorithm to obtain output parameters such as a lane change direction. However, the vehicle lane change intention determined based on the machine learning algorithm requires a large amount of historical data for training and learning, thereby leading to instability of the lane change intention, thus greatly increasing a safety risk of vehicle traveling, as a result, stability and safety requirements of the determination of the vehicle lane change intention cannot be met. Therefore, there is a need for a determination method for vehicle traffic efficiency to solve the above problems to perform vehicle lane change planning.

SUMMARY

In view of this, the present disclosure provides a determination method and a determination device for vehicle traffic efficiency, and a vehicle, with a main purpose of solving the problem of poor stability of the determination of the existing vehicle lane change intention.

According to an aspect of the present disclosure, a determination method for vehicle traffic efficiency is provided and includes:

determining obstacle vehicles in lanes corresponding to a traveling vehicle, the obstacle vehicles including a same-lane leading vehicle and a different-lane leading vehicle of the traveling vehicle, determining a vehicle block cost parameter based on a first velocity of the traveling vehicle and a second velocity of the same-lane leading vehicle, and obtaining an obstacle block cost parameter of the different-lane leading vehicle; and determining lane traffic efficiency based on the vehicle block cost parameter, the obstacle block cost parameter, and a block weight coefficient, so as to select, based on the lane traffic efficiency, a lane for vehicle lane changing, the lane traffic efficiency representing an expected smooth traffic condition when the traveling vehicle enters a lane.

In the embodiments of the present disclosure, obstacle vehicles in lanes corresponding to a traveling vehicle are determined, the obstacle vehicles include a same-lane leading vehicle and a different-lane leading vehicle of the traveling vehicle: a vehicle block cost parameter is determined based on a first velocity of the traveling vehicle and a second velocity of the same-lane leading vehicle, and an obstacle block cost parameter of the different-lane leading vehicle is obtained; and lane traffic efficiency is determined based on the vehicle block cost parameter, the obstacle block cost parameter, and a block weight coefficient, so as to select, based on the lane traffic efficiency, a lane for vehicle lane changing, and the lane traffic efficiency represents an expected smooth traffic condition when the traveling vehicle enters a lane. In this way, the lane traffic efficiency is directly solved by linear calculation, to serve as a judgment basis for a lane change, which greatly improves accuracy of recognition of a lane change intention and meets stability and safety requirements of determination of the vehicle lane change intention, thereby improving accuracy of lane change planning.

Further, the obstacle block cost parameter includes a blocked cost parameter and a self-block cost parameter, and the obtaining an obstacle block cost parameter of the different-lane leading vehicle includes:

determining the blocked cost parameter based on a difference between a third velocity of the different-lane leading vehicle and a fourth velocity of an associated leading vehicle; and determining the self-block cost parameter based on the third velocity, the fourth velocity, and a lane reference velocity, the lane reference velocity being determined based on a preset traveling velocity and a minimum lane velocity.

Further, the determining lane traffic efficiency based on the vehicle block cost parameter, the obstacle block cost parameter, and a block weight coefficient includes:

determining vehicle block efficiency based on a product of the vehicle block cost parameter and a first block weight coefficient;

calculating a first product of the blocked cost parameter and the first block weight coefficient and a first product of the self-block cost parameter and a second block weight coefficient respectively, and obtaining obstacle block efficiency based on a sum of the first products, and determining lane traffic efficiency based on a sum of the vehicle block efficiency and the obstacle block efficiency.

Further, the determining lane traffic efficiency based on a sum of the vehicle block efficiency and the obstacle block efficiency includes:

obtaining a first collision weight between the traveling vehicle and the same-lane leading vehicle and a second collision weight between the traveling vehicle and the different-lane leading vehicle; and calculating a second product of the vehicle block efficiency and the first collision weight and a second product of the obstacle block efficiency and the second collision weight respectively, and determining lane traffic efficiency based on a sum of the second products.

Further, the determining obstacle vehicles in lanes corresponding to a traveling vehicle includes:

searching for all leading obstacle vehicles corresponding to a traveling position of the traveling vehicle; and determining a same-lane leading vehicle and a different-lane leading vehicle based on lane positions of the leading obstacle vehicles.

Further, subsequent to the determining lane traffic efficiency based on the vehicle block cost parameter, the obstacle block cost parameter, and a block weight coefficient, the method further includes:

obtaining traveling state information of the traveling vehicle under a condition that vehicle collision time in a target lane selected based on the lane traffic efficiency matches reference collision time; and triggering a vehicle lane changing planning operation under a condition that the traveling state information does not match a lane change suppression strategy of the target lane.

Further, the method further includes:

starting a cooling timer for a lane change under a condition that the vehicle collision time in the target lane does not match the reference collision time or under a condition that the traveling state information matches the lane change suppression strategy of the target lane; and re-performing steps of determining obstacle vehicles in lanes corresponding to a traveling vehicle under a condition that the cooling timer reaches a preset cooling time interval.

According to another aspect of the present disclosure, a determination device for vehicle traffic efficiency is provided and includes:

a first determination module configured to determine obstacle vehicles in lanes corresponding to a traveling vehicle, the obstacle vehicles including a same-lane leading vehicle and a different-lane leading vehicle of the traveling vehicle;

an obtaining module configured to determine a vehicle block cost parameter based on a first velocity of the traveling vehicle and a second velocity of the same-lane leading vehicle, and obtain an obstacle block cost parameter of the different-lane leading vehicle; and a second determination module configured to determine lane traffic efficiency based on the vehicle block cost parameter, the obstacle block cost parameter, and a block weight coefficient, so as to select, based on the lane traffic efficiency, a lane for vehicle lane changing, the lane traffic efficiency representing an expected smooth traffic condition when the traveling vehicle enters a lane.

Further, the obstacle block cost parameter includes a blocked cost parameter and a self-block cost parameter, and the obtaining module includes:

a first determination unit configured to determine the blocked cost parameter based on a difference between a third velocity of the different-lane leading vehicle and a fourth velocity of an associated leading vehicle; and a second determination unit configured to determine the self-block cost parameter based on the third velocity, the fourth velocity, and a lane reference velocity, the lane reference velocity being determined based on a preset traveling velocity and a minimum lane velocity.

Further, the second determination module includes:

a third determination unit configured to determine vehicle block efficiency based on a product of the vehicle block cost parameter and a first block weight coefficient;

a calculation unit configured to calculate a first product of the blocked cost parameter and the first block weight coefficient and a first product of the self-block cost parameter and a second block weight coefficient respectively, and obtain obstacle block efficiency based on a sum of the first products; and a fourth determination unit configured to determine lane traffic efficiency based on a sum of the vehicle block efficiency and the obstacle block efficiency.

Further, the fourth determination unit is configured to obtain a first collision weight between the traveling vehicle and the same-lane leading vehicle and a second collision weight between the traveling vehicle and the different-lane leading vehicle; and calculate a second product of the vehicle block efficiency and the first collision weight and a second product of the obstacle block efficiency and the second collision weight respectively, and determine lane traffic efficiency based on a sum of the second products.

Further, the first determination module includes:

a search unit configured to search for all leading obstacle vehicles corresponding to a traveling position of the traveling vehicle; and a fifth determination unit configured to determine a same-lane leading vehicle and a different-lane leading vehicle based on lane positions of the leading obstacle vehicles.

Further, the device further includes a trigger module.

The obtaining module is configured to obtain traveling state information of the traveling vehicle under a condition that vehicle collision time in a target lane selected based on the lane traffic efficiency matches reference collision time.

The trigger module is configured to trigger a vehicle lane changing planning operation under a condition that the traveling state information does not match a lane change suppression strategy of the target lane.

Further, the device further includes:

a starting module configured to start a cooling timer for a lane change under a condition that the vehicle collision time in the target lane does not match the reference collision time or under a condition that the traveling state information matches the lane change suppression strategy of the target lane; and an execution module configured to re-perform steps of determining obstacle vehicles in lanes corresponding to a traveling vehicle under a condition that the cooling timer reaches a preset cooling time interval.

According to an aspect of the present disclosure, a vehicle is provided and includes the determination device for vehicle traffic efficiency as described above.

According to another aspect of the present disclosure, a readable storage medium is provided, storing a program or an instruction, when the program or instruction is executed by the processor, steps in the determination method for vehicle traffic efficiency as described above are implemented.

According to yet another aspect of the present disclosure, a computer device is provided, including at least one processor, the processor is coupled to a memory, a program or an instruction run on the processor is stored in the memory, and when the program or instruction is executed by the processor, steps in the determination method for vehicle traffic efficiency as described above are implemented.

The foregoing description is merely an overview of the technical solutions of the present disclosure. To better illustrate the present disclosure, implementation can be performed according to content of the specification. Moreover, to make the foregoing and other objectives, features, and advantages of the present disclosure more comprehensible, specific embodiments of the present disclosure are particularly listed below.

BRIEF DESCRIPTION OF DRAWINGS

Through reading of detailed description of preferred embodiments below, other advantages and beneficial effects will become apparent for those skilled in the art. The accompanying drawings are merely for illustrating an objective of the preferred embodiments, rather than for limiting the present disclosure. Moreover, in the whole drawings, same reference numerals represent identical parts. In the drawings.

DESCRIPTION OF EMBODIMENTS

Exemplary embodiments of the present disclosure will be described in more details below with reference to the accompanying drawings. Although the exemplary embodiments of the present disclosure are shown in the accompanying drawings, it is to be understood that the present disclosure may be implemented in various forms and shall not be limited to the embodiments described herein. Rather, these embodiments are provided for better illustration of the present disclosure and to better illustrate a scope of the present disclosure to those skilled in the art.

Figure 1:
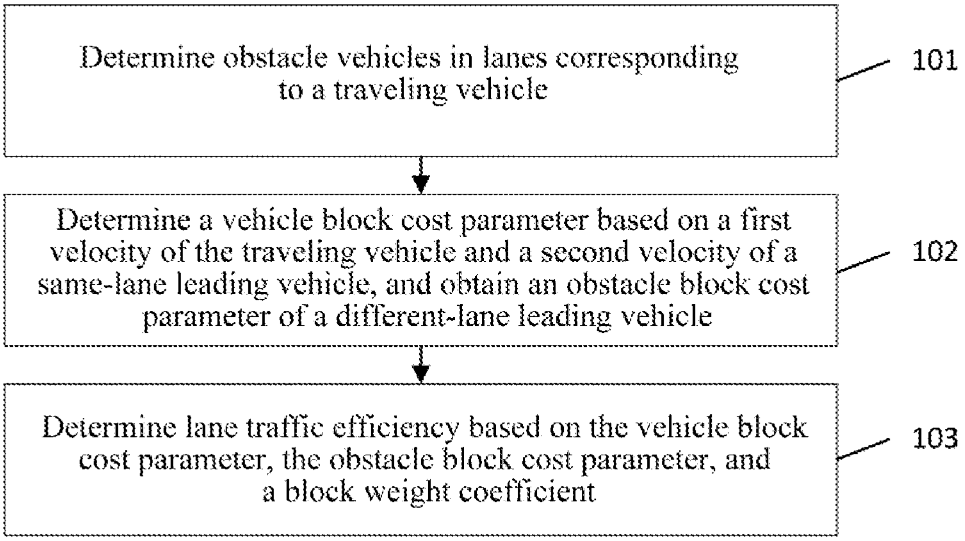
FIG. 1 is a flowchart of a determination method for vehicle traffic efficiency according to some embodiments of the present disclosure.

Some embodiments of the present disclosure provide a determination method for vehicle traffic efficiency. As shown in FIG. 1, the method includes the following steps.

In 101, obstacle vehicles in various lanes corresponding to a traveling vehicle are determined.

In some embodiments of the present disclosure, during trajectory planning of a driverless intelligent vehicle, an automatic driving processor as a current execution body may be a processor configured on a vehicle, a cloud server that matches the vehicle, or the like. In this case, the current execution body determines obstacle vehicles in various lanes corresponding to a traveling vehicle to calculate vehicle traffic efficiency, thereby determining whether the traveling vehicle may make a lane change into a corresponding lane. The obstacle vehicles include a same-lane leading vehicle and a different-lane leading vehicle of the traveling vehicle. Herein, the same-lane leading vehicle is a front vehicle in a same lane as the traveling vehicle, and the different-lane leading vehicle is a front vehicle in different lanes from the traveling vehicle, which may be one or more. In this case, different lanes are preferably determined as a left lane and a right lane of the same lane, which are not limited in the present disclosure.

It is to be noted that the vehicle refers to a vehicle with an automatic control system in an automatic driving scenario, including a passenger vehicle and a commercial vehicle. The passenger vehicle may be, but is not limited to, a sedan, a sport utility vehicle, a multi-person commercial vehicle, and the like. The commercial vehicle may be, but is not limited to, a pickup truck, a minibus, a self-unloading truck, a truck, a tractor, a trailer, a mining vehicle, and the like. In this case, the vehicle can realize automatic driving based on the automatic control system.

In 102, a vehicle block cost parameter is determined based on a first velocity of the traveling vehicle and a second velocity of the same-lane leading vehicle, and an obstacle block cost parameter of the different-lane leading vehicle is obtained.

In some embodiments of the present disclosure, since a traveling state of the traveling vehicle in the same lane is limited to a velocity of the same-lane leading vehicle, the current execution body determines the vehicle block cost parameter based on the first velocity of the traveling vehicle and the second velocity of the same-lane leading vehicle. The current execution body may separately scan the traveling vehicle and the same-lane leading vehicle respectively based on a sensing system to determine the first velocity and the second velocity, so that the current execution body can calculate the vehicle block cost parameter. For example, the vehicle block cost parameter is egoBlockedCost=max (v_ego−v_lead, 0), where v_ego denotes the first velocity, and v_lead denotes the second velocity. That is, a maximum value in a difference between the first velocity and the second velocity and 0 is determined as the vehicle block cost parameter.

It is to be noted that, when the traveling vehicle has a lane change, the traveling state after the lane change is limited by a velocity of a leading vehicle in a to-be-changed lane, so the current execution body obtains the obstacle block cost parameter of the different-lane leading vehicle. In this case, the obstacle block cost parameter includes a blocked cost parameter and a self-block cost parameter. The blocked cost parameter represents a situation where the traveling vehicle has a lane change and is then affected by the velocity of the front vehicle in the lane after the lane change. The self-block cost parameter represents a situation where the traveling vehicle has a lane change and is then affected by a velocity limit of the lane after the lane change and a set velocity for automatic driving, to determine lane traffic efficiency in the to-be-changed lane.

In 103, lane traffic efficiency is determined based on the vehicle block cost parameter, the obstacle block cost parameter, and a block weight coefficient.

In some embodiments of the present disclosure, the lane traffic efficiency represents an expected smooth traffic condition when the traveling vehicle enters a lane, so that the current execution body selects, based on the lane traffic efficiency of each lane, a lane for vehicle lane changing. For example, the block weight coefficient represents block effects caused by expected collisions with other vehicles when the traveling vehicle is traveling at the set velocity for automatic driving and at the velocity limitation in the lane, which may be configured or may be calculated based on collision time or velocities between the traveling vehicle and other vehicle. The block weight coefficient includes a first block weight coefficient and a second block weight coefficient, which is not limited in the present disclosure. After the lane traffic efficiency is determined, whether the traveling vehicle has a lane change may be judged based on the lane traffic efficiency.

In some other embodiments of the present disclosure, for further description and limitation, the obstacle block cost parameter includes a blocked cost parameter and a self-block cost parameter, and the step of obtaining an obstacle block cost parameter of the different-lane leading vehicle includes: determining the blocked cost parameter based on a difference between a third velocity of the different-lane leading vehicle and a fourth velocity of an associated leading vehicle; and determining the self-block cost parameter based on the third velocity, the fourth velocity, and a lane reference velocity.

In order to accurately obtain the obstacle block cost parameter of the different-lane leading vehicle to improve effectiveness of calculation of the lane traffic efficiency to ensure a safe and effective lane change of the vehicle, for example, the current execution body determines the blocked cost parameter based on the difference between the third velocity of the different-lane leading vehicle and the fourth velocity of the associated leading vehicle. The third velocity of the different-lane leading vehicle and the fourth velocity of the associated leading vehicle may be determined by scanning the different-lane leading vehicle and the associated leading vehicle by the sensing system. The associated leading vehicle is a vehicle in front of the different-lane leading vehicle. The blocked cost parameter is objectBlockedCost=max(v_object−v_object_front, 0), where v_object denotes the third velocity, and v_object_front denotes the fourth velocity. That is, after the difference between the third velocity and the fourth velocity is determined, a maximum value in the difference and 0 is taken as the blocked cost parameter. In addition, the lane reference velocity is determined based on a preset traveling velocity and a minimum lane velocity. The preset traveling velocity is an automatic driving velocity preset for the traveling vehicle. The minimum lane velocity is a minimum lane velocity limitation. Then, the self-block cost parameter is determined as objectSelfCost=max(min(v_object_front, v_prefered)−v_object, 0), where v_prefered=min(user_set_velocity, lane_velocity_limit), user_set_velocity denotes the preset traveling velocity, and lane_velocity_limit denotes the minimum lane velocity, so as to determine the self-block cost parameter in conjunction with the third velocity and the fourth velocity on the basis of taking a smaller value in the minimum lane velocity and the preset traveling velocity as the lane reference velocity.

Figure 2:
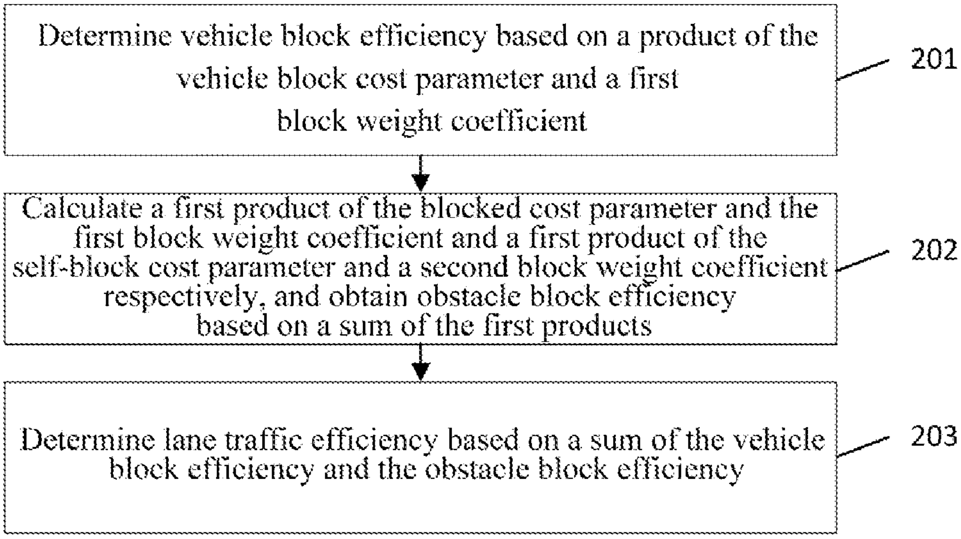
FIG. 2 is a flowchart of another determination method for vehicle traffic efficiency according to some embodiments of the present disclosure.

In some other embodiments of the present disclosure, for further description and limitation, as shown in FIG. 2, the step of determining lane traffic efficiency based on the vehicle block cost parameter, the obstacle block cost parameter, and a block weight coefficient includes: 201, determining vehicle block efficiency based on a product of the vehicle block cost parameter and a first block weight coefficient; 202, calculating a first product of the blocked cost parameter and the first block weight coefficient and a first product of the self-block cost parameter and a second block weight coefficient respectively, and obtaining obstacle block efficiency based on a sum of the first products; and 203, determining lane traffic efficiency based on a sum of the vehicle block efficiency and the obstacle block efficiency.

In order to improve effectiveness of the determination of the lane traffic efficiency and meet a requirement for lane change planning based on the vehicle traffic efficiency, in some embodiments of the present disclosure, when the lane traffic efficiency is determined based on the vehicle block cost parameter, the obstacle block cost parameter, and the block weight coefficient, since the block weight coefficient includes a first block weight coefficient and a second block weight coefficient, the vehicle block efficiency is obtained through a product of the vehicle block cost parameter and the first block weight coefficient, denoted as $a_1$*egoBlockedCost, a product of the blocked cost parameter and the first block weight coefficient is denoted as $a_1$*objectBlockedCost$_i$, a product of the self-block cost parameter and the second block weight coefficient is denoted as $a_2$*objectSelfCost$_i$, and the obstacle block efficiency is obtained through a sum of the products, denoted as $$\sum_{1=<i<=N}(a_1 * objectBlockedCost_i + a_2 * objectSelfCost_i).$$

Then, in some embodiments of the present disclosure, the determining the lane traffic efficiency based on a sum of the vehicle block efficiency and the obstacle block efficiency is expressed as:

$$LaneEfficiencyCost = a_1 * egoBlockedCost + \sum_{1=<i<=N}(a_1 * objectBlockedCost_i + a_2 * objectSelfCost_i),$$

where LaneEfficiencyCost denotes the vehicle traffic efficiency, egoBlockedCost denotes the vehicle block cost parameter, objectBlockedCost$_i$ denotes the blocked cost parameter, objectSelfCost$_i$ denotes the self-block cost parameter, $a_1$ denotes the first block weight coefficient, $a_2$ denotes the second block weight coefficient, i denotes an $i^{th}$ vehicle, and N denotes a total number of obstacle vehicles determined.

In some other embodiments of the present disclosure, for further description and limitation, the step of determining the lane traffic efficiency based on a sum of the vehicle block efficiency and the obstacle block efficiency includes: obtaining a first collision weight between the traveling vehicle and the same-lane leading vehicle and a second collision weight between the traveling vehicle and the different-lane leading vehicle; and calculating a second product of the vehicle block efficiency and the first collision weight and a second product of the obstacle block efficiency and the second collision weight respectively, and determining the lane traffic efficiency based on a sum of the second products.

In order to ensure no collision between the traveling vehicle and the obstacle vehicles during lane change planning based on the lane traffic efficiency, the lane traffic efficiency may be determined in conjunction with a collision weight, so as to improve the effectiveness of the determination of the lane traffic efficiency. For example, the current execution body obtains a first collision weight $\omega_1$, between the traveling vehicle and the same-lane leading vehicle and a second collision weight $\omega_1$, between the traveling vehicle and the different-lane leading vehicle. When v_object≥v_prefered, the first collision weight $\omega_i$ is configured as 0, and when v_object<v_prefered, determination may be made based on vehicle collision time ttc=distance/(object_v−v_prefered). That is, the larger the ttc, the smaller the value of the second collision weight $\omega_i$. Herein. "distance" denotes a preset following distance and is configured based on a lane change requirement, the first collision weight $\omega_1$ is configured based on v_lead of the same-lane leading vehicle. For example, higher the velocity, the smaller the value of the first collision weight $\omega_i$. Specific limitations are not made in the present disclosure. For example, in some embodiments of the present disclosure, the lane traffic efficiency may be calculated by:

$$LaneEfficiencyCost = a_1 * egoBlockedCost * \omega_i + \sum_{1=<i<=N} (a_1 * objectBlockedCost_i + a_2 * objectSelfCost_i) * \omega_i.$$

In some other embodiments of the present disclosure, for further description and limitation, the step of determining obstacle vehicles in various lanes corresponding to a traveling vehicle includes: searching for all leading obstacle vehicles corresponding to a traveling position of the traveling vehicle; and determining a same-lane leading vehicle and a different-lane leading vehicle based on lane positions of the leading obstacle vehicles.

Figure 3:
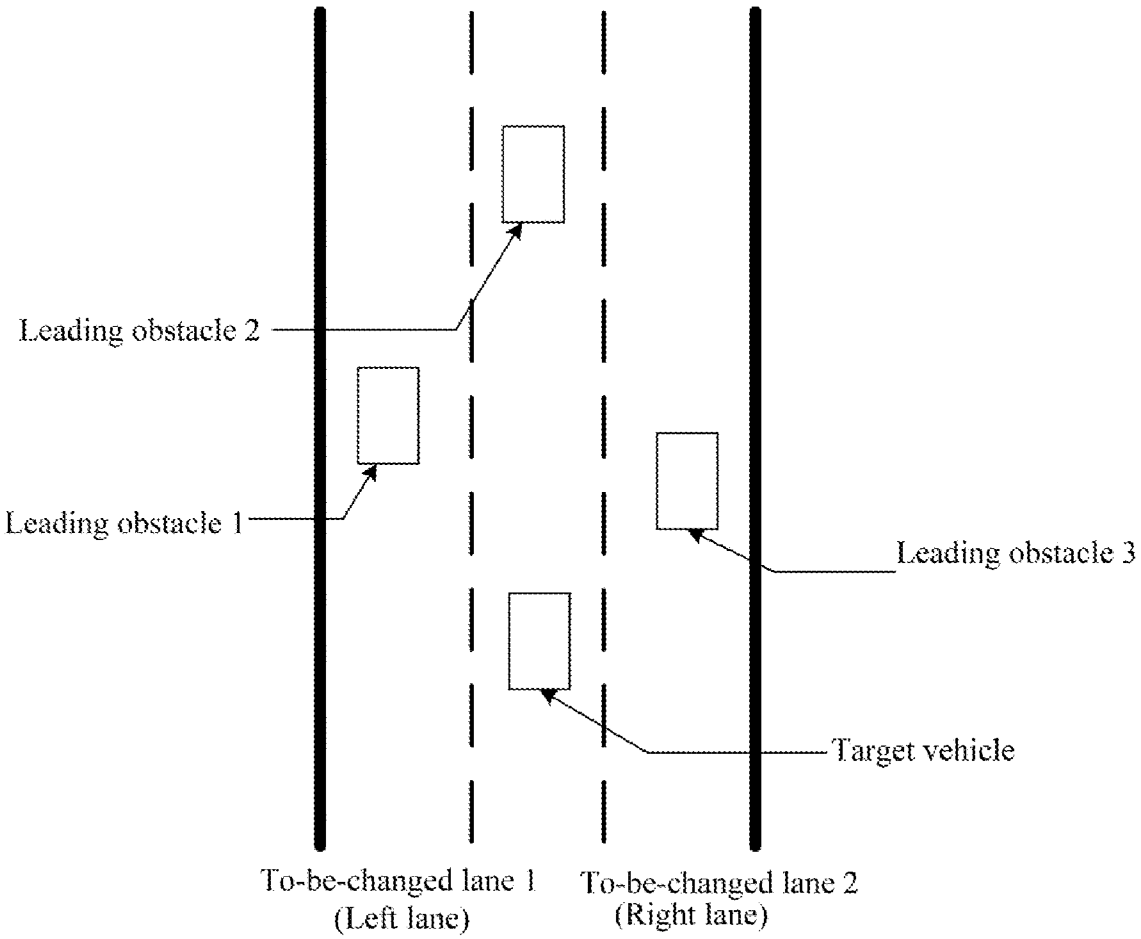
FIG. 3 is a schematic diagram of sensing a different-lane or same-lane obstacle vehicle of a traveling vehicle according to some embodiments of the present disclosure.

In order to accurately determine the obstacle vehicles that affect the lane change of the traveling vehicle to effectively improve the lane traffic efficiency of the traveling vehicle for a lane change, the current execution body first determines a traveling position of the traveling vehicle to find all leading obstacle vehicles corresponding to the traveling position through the sensing system. The traveling position refers to a specific lane position of the traveling vehicle in the lane. For example, when the vehicle is traveling on an expressway having four lanes, it may be determined by the sensing system or a global satellite navigation system based on the traveling position of the traveling vehicle that the traveling vehicle is in a second lane on the left, which is not limited in the present disclosure. Then, all leading obstacle vehicles corresponding to the traveling position are searched for through a sensing system, for example, a leading obstacle vehicle 1, a leading obstacle vehicle 2, and a leading obstacle vehicle 3 corresponding to a traveling vehicle ego as shown in FIG. 3, which are not limited in the present disclosure. In addition, in order to calculate the vehicle block cost parameter and the obstacle block cost parameter respectively, the same-lane leading vehicle and the different-lane leading vehicle are determined respectively based on lane positions of the leading obstacle vehicles. For example, the leading obstacle vehicle 2 is the same-lane leading vehicle, the leading obstacle vehicle 1 and the leading obstacle vehicle 3 are different-lane leading vehicles, further, the leading obstacle vehicle 1 is a left-lane leading vehicle, and the leading obstacle vehicle 3 is a right-lane leading vehicle.

It is to be noted that the sensing system in some embodiments of the present disclosure may be a system having a function of scanning images in units of time frames, so as to determine information such as a velocity and a position of the vehicle based on a vehicle position in each frame of image, and content such as environment information of the vehicle may also be determined based on recognition of each frame of image data, which is not limited in the present disclosure.

Figure 4:
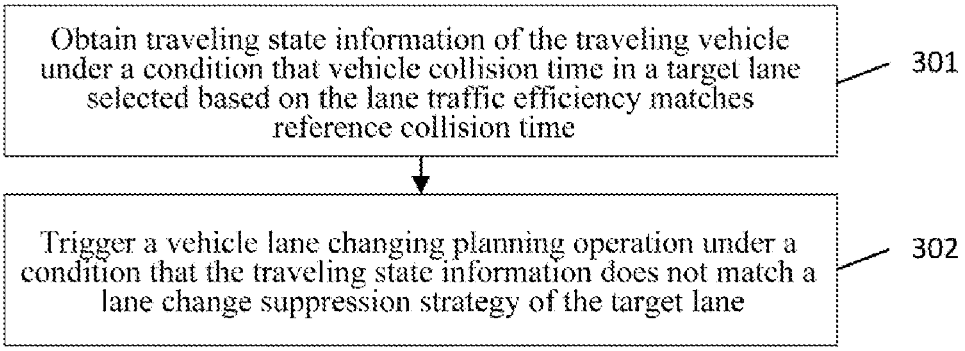
FIG. 4 is a flowchart of another determination method for vehicle traffic efficiency according to some embodiments of the present disclosure.

In some other embodiments of the present disclosure, for further description and limitation, as shown in FIG. 4, subsequent to the step of determining lane traffic efficiency based on the vehicle block cost parameter, the obstacle block cost parameter, and a block weight coefficient, the method further includes: 301, obtaining traveling state information of the traveling vehicle under a condition that vehicle collision time in a target lane selected based on the lane traffic efficiency matches reference collision time, and 302, triggering a vehicle lane changing planning operation under a condition that the traveling state information does not match a lane change suppression strategy of the target lane.

In order to select the target lane based on the lane traffic efficiency to enable the traveling vehicle to change a road safely and effectively, after the lane traffic efficiency is determined, the target lane is selected based on the lane traffic efficiency. Preferably, a lane corresponding to a maximum value in a plurality of lane traffic efficiencies is selected as the target lane, or a plurality of traveling vehicles meeting a preset lane change condition may be selected, which is not limited in the present disclosure. In addition, after the current execution body selects the target lane, in order to prevent a collision of the traveling vehicle after entering a to-be-changed target lane with an obstacle vehicle, matching is performed in advance based on vehicle collision time in the target lane and reference collision time, to serve as a basis for judging entry into the target lane. The reference collision time is determined based on a steady-state following factor and a preset following distance. The steady-state following factor represents a requirement for the traveling vehicle to stably follow the front vehicle. When the current execution body is configured in advance based on an automatic driving following requirement of the traveling vehicle, for example, the steady-state following factor=0.9, the preset following distance represents a minimum distance for the traveling vehicle to stably follow the front vehicle. The current execution body is configured in advance based on the automatic driving following requirement of the traveling vehicle, which is not limited in the present disclosure. Then, in order to ensure that the traveling vehicle does not collide with other obstacle vehicles in the target lane after the lane change, the reference collision time is directly determined based on the steady-state following factor and the preset following distance, and may be, for example, manually configured directly or calculated through a linear relationship, which is not limited in the present disclosure. The vehicle collision time is time when the traveling vehicle is expected to collide with other obstacles after changing the lane to the target lane, and may be calculated based on the velocity of the traveling vehicle and a sensed distance of the obstacle vehicle, which is not limited in the present disclosure. In this case, the current execution body obtains traveling state information of the traveling vehicle. The traveling state information includes, but is not limited to, a traveling velocity, traveling scene information, a lane change function state, a lane change duration, an automatic traveling state, and the like, so as to perform matching based on the traveling state information and the lane change suppression strategy. The traveling state information may be obtained by scanning based on the sensing system, or obtained based on data recorded in the current execution body, or obtained based on a vehicle navigation system, which is not limited in the present disclosure.

It is to be noted that the lane change suppression strategy of the traveling vehicle is pre-configured in the current execution body, so as to judge based on the traveling state information of the traveling vehicle whether a lane change condition is met, so that the traveling vehicle performs vehicle lane changing planning when meeting the lane change condition. The lane change suppression strategy includes at least one sub-rule that blocks a lane change of the traveling vehicle. For example, if the traveling scene information in the traveling state information is that the traveling vehicle is in a non-ramp and the sub-rule is that lane changes are prohibited on ramps, indicating that the traveling vehicle does not match the lane change suppression strategy of the target lane, then the current execution body generates a lane change instruction of the target lane, which is not limited in the present disclosure. Different lane change suppression sub-strategies may be pre-configured in the current execution body, so as to meet real-time changing lane change requirements. For example, the lane change suppression strategy may include, but is not limited to, any one of or a combination of a plurality of sub-rules of prohibiting lane changes if an overtaking lane change automatic driving function is not enabled, prohibiting lane changes on non-highway roads, prohibiting lane changes in solid lanes, prohibiting lane changes when there are dangerous vehicles behind, prohibiting lane changes when a lane change cooling duration is less than a preset duration, prohibiting lane changes in non-automatic driving states, prohibiting lane changes on ramps within a preset distance ahead, prohibiting lane changes when a target vehicle velocity is lower than a preset vehicle velocity, prohibiting lane changes when a curvature velocity limit of the traveling vehicle is less than a preset velocity, and prohibiting lane changes when there is a fixed obstacle in front of the target lane, which is not limited in the present disclosure. In addition, after triggering the vehicle lane changing planning operation, the current execution body plans, based on path planning of automatic driving, a traveling route for the traveling vehicle to change a lane and enter the target lane, so that the vehicle automatically travels based on a planned path and enters the target lane, which is not limited in the present disclosure.

In some other embodiments of the present disclosure, for further description and limitation, the step further includes; starting a cooling timer for a lane change under a condition that the vehicle collision time in the target lane does not match the reference collision time or under a condition that the traveling state information matches the lane change suppression strategy of the target lane; and re-performing steps of determining obstacle vehicles in lanes corresponding to a traveling vehicle under a condition that the cooling timer reaches a preset cooling time interval.

In order to meet safety and effectiveness requirements for vehicle lane changes, in a specific scene in some embodiments of the present disclosure, when the vehicle collision time in the target lane does not match the reference collision time or the traveling state information matches the lane change suppression strategy, it indicates that the target vehicle is not suitable for a lane change, so the current execution body starts a cooling timer so as to re-perform steps of determining obstacle vehicles in lanes corresponding to a traveling vehicle and subsequent steps after the cooling timer reaches a preset cooling time interval, to determine next vehicle traffic efficiency. In another specific scene in some embodiments of the present disclosure, the current execution body may update the to-be-changed lane of the target vehicle, and may determine next vehicle traffic efficiency when the preset cooling time interval is reached, which indicates that the timer reaches the preset cooling time interval after the target vehicle changes the lane to the target lane. Then, the current execution body performs a step of determining obstacle vehicles in lanes corresponding to a traveling vehicle and subsequent steps, to determine next vehicle traffic efficiency. The preset cooling time interval may be 2 s, 5 s, or the like, and may be configured based on a lane change requirement, which is not limited in the present disclosure.

Some embodiments of the present disclosure provide a determination method for vehicle traffic efficiency. Compared with the related art, in some embodiments of the present disclosure, obstacle vehicles in lanes corresponding to a traveling vehicle are determined, the obstacle vehicles include a same-lane leading vehicle and a different-lane leading vehicle of the traveling vehicle; a vehicle block cost parameter is determined based on a first velocity of the traveling vehicle and a second velocity of the same-lane leading vehicle, and an obstacle block cost parameter of the different-lane leading vehicle is obtained; and lane traffic efficiency is determined based on the vehicle block cost parameter, the obstacle block cost parameter, and a block weight coefficient, so as to select, based on the lane traffic efficiency, a lane for vehicle lane changing, and the lane traffic efficiency represents an expected smooth traffic condition when the traveling vehicle enters a lane. In this way, the lane traffic efficiency is directly solved by linear calculation, to serve as a judgment basis for a lane change, which greatly improves accuracy of recognition of a lane change intention and meets stability and safety requirements of determination of the vehicle lane change intention, thereby improving accuracy of lane change planning.

Figure 5:
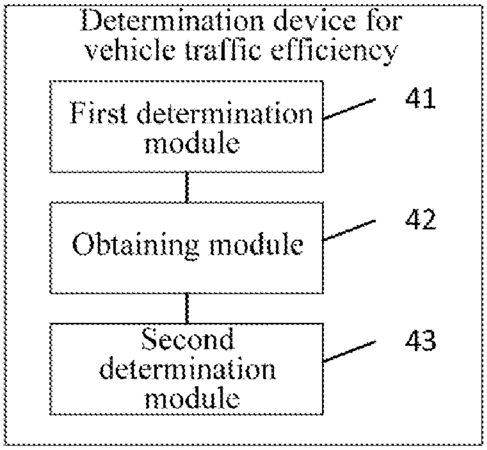
FIG. 5 is a block diagram of components of a determination device for vehicle traffic efficiency according to some embodiments of the present disclosure.

Further, as an implementation for the above method shown in FIG. 1, some embodiments of the present disclosure provide a determination device for vehicle traffic efficiency. As shown in FIG. 5, the device includes a first determination module 41, an obtaining module 42, and a second determination module 43.

The first determination module 41 is configured to determine obstacle vehicles in lanes corresponding to a traveling vehicle, and the obstacle vehicles include a same-lane leading vehicle and a different-lane leading vehicle of the traveling vehicle.

The obtaining module 42 is configured to determine a vehicle block cost parameter based on a first velocity of the traveling vehicle and a second velocity of the same-lane leading vehicle, and obtain an obstacle block cost parameter of the different-lane leading vehicle.

The second determination module 43 is configured to determine lane traffic efficiency based on the vehicle block cost parameter, the obstacle block cost parameter, and a block weight coefficient, so as to select, based on the lane traffic efficiency, a lane for vehicle lane changing, and the lane traffic efficiency represents an expected smooth traffic condition when the traveling vehicle enters a lane.

Further, the obstacle block cost parameter includes a blocked cost parameter and a self-block cost parameter, and the obtaining module includes a first determination unit and a second determination unit.

The first determination unit is configured to determine the blocked cost parameter based on a difference between a third velocity of the different-lane leading vehicle and a fourth velocity of an associated leading vehicle.

The second determination unit is configured to determine the self-block cost parameter based on the third velocity, the fourth velocity, and a lane reference velocity, and the lane reference velocity is determined based on a preset traveling velocity and a minimum lane velocity.

Further, the second determination module includes a third determination unit, a calculation unit and a fourth determination unit.

The third determination unit is configured to determine vehicle block efficiency based on a product of the vehicle block cost parameter and a first block weight coefficient;

The calculation unit is configured to calculate a first product of the blocked cost parameter and the first block weight coefficient and a first product of the self-block cost parameter and a second block weight coefficient respectively; and obtain obstacle block efficiency based on a sum of the first products.

The fourth determination unit is configured to determine lane traffic efficiency based on a sum of the vehicle block efficiency and the obstacle block efficiency.

Further, the fourth determination unit is configured to obtain a first collision weight between the traveling vehicle and the same-lane leading vehicle and a second collision weight between the traveling vehicle and the different-lane leading vehicle; and calculate a second product of the vehicle block efficiency and the first collision weight and a second product of the obstacle block efficiency and the second collision weight respectively; and determine lane traffic efficiency based on a sum of the second products.

Further, the first determination module includes a search unit and a fifth determination unit.

The search unit is configured to search for all leading obstacle vehicles corresponding to a traveling position of the traveling vehicle.

The fifth determination unit is configured to determine a same-lane leading vehicle and a different-lane leading vehicle based on lane positions of the leading obstacle vehicles.

Further, the device further includes a trigger module.

The obtaining module is configured to obtain traveling state information of the traveling vehicle under a condition that vehicle collision time in a target lane selected based on the lane traffic efficiency matches reference collision time.

The trigger module is configured to trigger a vehicle lane changing planning operation under a condition that the traveling state information does not match a lane change suppression strategy of the target lane.

Further, the device further includes a starting module and an execution module.

The starting module is configured to start a cooling timer for a lane change under a condition that the vehicle collision time in the target lane does not match the reference collision time or under a condition that the traveling state information matches the lane change suppression strategy of the target lane.

The execution module is configured to re-perform steps of determining obstacle vehicles in lanes corresponding to a traveling vehicle under a condition that the cooling timer reaches a preset cooling time interval.

Some embodiments of the present disclosure provide a determination device for vehicle traffic efficiency. Compared with the related art, in some embodiments of the present disclosure, obstacle vehicles in lanes corresponding to a traveling vehicle are determined, and the obstacle vehicles include a same-lane leading vehicle and a different-lane leading vehicle of the traveling vehicle, a vehicle block cost parameter is determined based on a first velocity of the traveling vehicle and a second velocity of the same-lane leading vehicle, and an obstacle block cost parameter of the different-lane leading vehicle is obtained; and lane traffic efficiency is determined based on the vehicle block cost parameter, the obstacle block cost parameter, and a block weight coefficient, so as to select, based on the lane traffic efficiency, a lane for vehicle lane changing, and the lane traffic efficiency represents an expected smooth traffic condition when the traveling vehicle enters a lane. In this way, the lane traffic efficiency is directly solved by linear calculation, to serve as a judgment basis for a lane change, which greatly improves accuracy of recognition of a lane change intention and meets stability and safety requirements of determination of the vehicle lane change intention, thereby improving accuracy of lane change planning.

According to some embodiments of the present disclosure, a vehicle is provided and includes the above-mentioned determination device for vehicle traffic efficiency.

According to some embodiments of the present disclosure, a readable storage medium is provided. The readable storage medium stores a program or an instruction. When the program or instruction is executed by the processor, steps in the determination method for vehicle traffic efficiency as described above are implemented.

Figure 6:
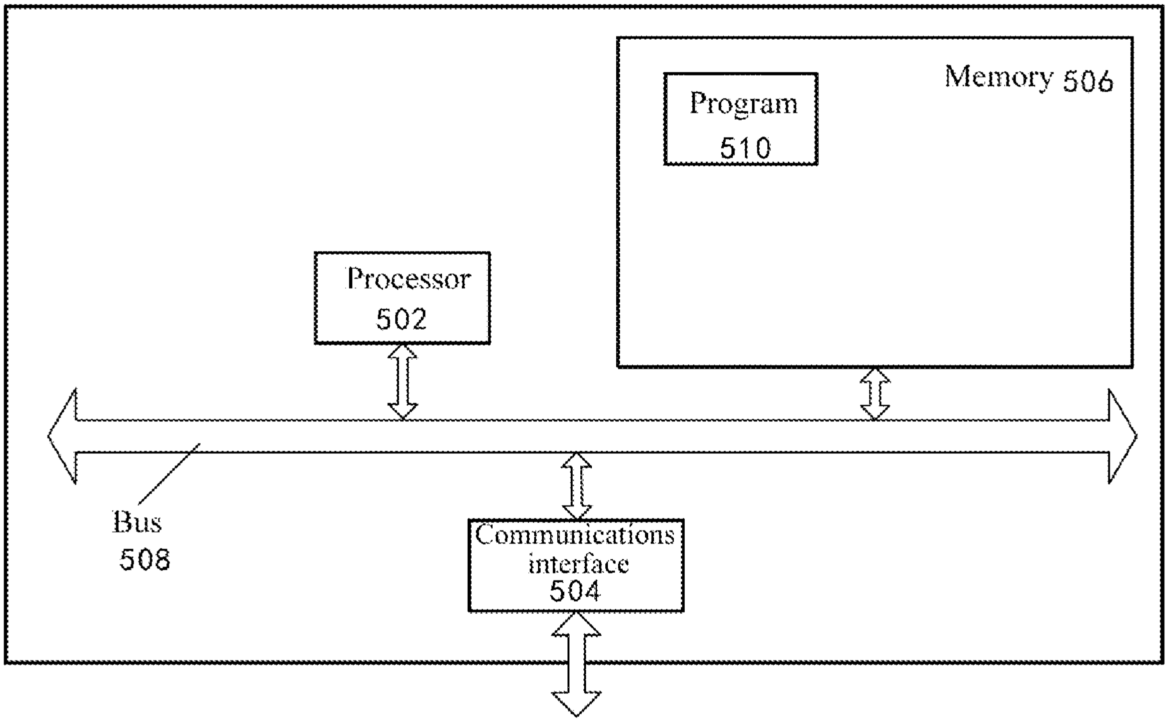
FIG. 6 is a schematic structural diagram of a terminal according to some embodiments of the present disclosure.

FIG. 6 is a schematic structural diagram of a computer device according to some embodiments of the present disclosure, including at least one processor. The processor is coupled to a memory, a program or an instruction run on the processor is stored in the memory, and when the program or instruction is executed by the processor, steps in the determination method for vehicle traffic efficiency as described above are implemented. Specific embodiments of the present disclosure do not limit specific implementation of the computer device.

As shown in FIG. 6, the computer device may include: a processor 502, a communications interface 504, a memory 506, and a communications bus 508.

The processor 502, the communications interface 504, and the memory 506 communicate with each other by using the communications bus 508.

The communications interface 504 is configured to communicate with network elements of other devices such as clients or other servers.

The processor 502 is configured to perform a program 510, for example, perform related steps in the embodiments of the determination method for vehicle traffic efficiency described above.

For example, the program 510 may include program codes. The program codes include computer operating instructions.

The processor 502 may be a central processing unit (CPU) or an Application Specific Integrated Circuit (ASIC), or one or more integrated circuits configured to implement embodiments of the present disclosure. The one or more processors included in the terminal may be processors of a same type, for example, one or more CPUs; or processors of different types, for example, one or more CPUs and one or more ASICs.

The memory 506 is configured to store the program 510. The memory 506 may include a high-velocity random access memory (RAM), and may also include a non-volatile memory, such as at least one disk memory.

The program 510 may be configured to cause the processor 502 to perform the following operations: determining obstacle vehicles in lanes corresponding to a traveling vehicle, the obstacle vehicles including a same-lane leading vehicle and a different-lane leading vehicle of the traveling vehicle; determining a vehicle block cost parameter based on a first velocity of the traveling vehicle and a second velocity of the same-lane leading vehicle, and obtaining an obstacle block cost parameter of the different-lane leading vehicle; and determining lane traffic efficiency based on the vehicle block cost parameter, the obstacle block cost parameter, and a block weight coefficient, so as to select, based on the lane traffic efficiency, a lane for vehicle lane changing, the lane traffic efficiency representing an expected smooth traffic condition when the traveling vehicle enters a lane.

Those skilled in the art should understand that the above modules or steps of the present disclosure can be implemented by a general computing device, which may be concentrated on a single computing device or distributed across a network composed of multiple computing devices. In some embodiments, the modules or steps may be implemented by program codes executable by the computing devices, so that the modules or steps may be stored in a storage device and executed by the computing devices. Moreover, in some cases, the illustrated or described steps may be executed in sequence different from those described herein, or the modules or steps may be made into various integrated circuit modules or a single integrated circuit module for implementation. In this way, the present disclosure is not limited to any specific combination of hardware(s) and software(s).

The above descriptions are only preferred embodiments of the present disclosure and are not intended to limit the present disclosure. For those skilled in the art, the present disclosure may have various modifications and changes. Any modifications, equivalent replacements, improvements, and the like made within the spirit and principles of the present disclosure shall be included in the protection scope of the present disclosure.

What is claimed is:

1. A determination method for vehicle traffic efficiency, comprising:

determining obstacle vehicles in lanes corresponding to a traveling vehicle, wherein the obstacle vehicles comprise a same-lane leading vehicle and a different-lane leading vehicle of the traveling vehicle;

determining a vehicle block cost parameter based on a first velocity of the traveling vehicle and a second velocity of the same-lane leading vehicle, and obtaining an obstacle block cost parameter of the different-lane leading vehicle; and determining lane traffic efficiency based on the vehicle block cost parameter, the obstacle block cost parameter, and a block weight coefficient, so as to select, based on the lane traffic efficiency, a lane for vehicle lane changing, wherein the lane traffic efficiency represents an expected smooth traffic condition when the traveling vehicle enters a lane, wherein the obstacle block cost parameter comprises a blocked cost parameter and a self-block cost parameter, and the obtaining an obstacle block cost parameter of the different-lane leading vehicle comprises:

determining the blocked cost parameter based on a difference between a third velocity of the different-lane leading vehicle and a fourth velocity of an associated leading vehicle, the associated leading vehicle being a vehicle in front of the different-lane leading vehicle; and determining the self-block cost parameter based on the third velocity, the fourth velocity, and a lane reference velocity, wherein the lane reference velocity is determined based on a preset traveling velocity and a minimum lane velocity.

2. The determination method according to claim 1, wherein the determining lane traffic efficiency based on the vehicle block cost parameter, the obstacle block cost parameter, and a block weight coefficient comprises:

determining vehicle block efficiency based on a product of the vehicle block cost parameter and a first block weight coefficient;

calculating a first product of the blocked cost parameter and the first block weight coefficient and a first product of the self-block cost parameter and a second block weight coefficient respectively, and obtaining obstacle block efficiency based on a sum of the first products; and determining lane traffic efficiency based on a sum of the vehicle block efficiency and the obstacle block efficiency.

3. The determination method according to claim 2, wherein the determining lane traffic efficiency based on a sum of the vehicle block efficiency and the obstacle block efficiency comprises:

obtaining a first collision weight between the traveling vehicle and the same-lane leading vehicle and a second collision weight between the traveling vehicle and the different-lane leading vehicle; and calculating a second product of the vehicle block efficiency and the first collision weight and a second product of the obstacle block efficiency and the second collision weight respectively, and determining lane traffic efficiency based on a sum of the second products.

4. The determination method according to claim 1, wherein determining the obstacle vehicles in lanes corresponding to the traveling vehicle comprises:

searching for all leading obstacle vehicles corresponding to a traveling position of the traveling vehicle; and determining a same-lane leading vehicle and a different-lane leading vehicle based on lane positions of the leading obstacle vehicles.

5. The determination method according to claim 1, wherein, subsequent to the determining lane traffic efficiency based on the vehicle block cost parameter, the obstacle block cost parameter, and a block weight coefficient, the method further comprises:

obtaining traveling state information of the traveling vehicle under a condition that vehicle collision time in a target lane selected based on the lane traffic efficiency matches reference collision time; and triggering a vehicle lane changing planning operation under a condition that the traveling state information does not match a lane change suppression strategy of the target lane.

6. The determination method according to claim 5, further comprising:

starting a cooling timer for a lane change under a condition that the vehicle collision time in the target lane does not match the reference collision time or under a condition that the traveling state information matches the lane change suppression strategy of the target lane; and re-performing steps of determining obstacle vehicles in lanes corresponding to the traveling vehicle under a condition that the cooling timer reaches a preset cooling time interval.

7. A determination device for vehicle traffic efficiency, comprising:

one or more processors, and a non-transitory storage medium in communication with the one or more processors, the non-transitory storage medium configured to store program instructions, wherein, when executed by the one or more processors, the program instructions cause the determination device to perform:

determining obstacle vehicles in lanes corresponding to a traveling vehicle, wherein the obstacle vehicles comprise a same-lane leading vehicle and a different-lane leading vehicle of the traveling vehicle;

determining a vehicle block cost parameter based on a first velocity of the traveling vehicle and a second velocity of the same-lane leading vehicle, and obtain an obstacle block cost parameter of the different-lane leading vehicle; and determining lane traffic efficiency based on the vehicle block cost parameter, the obstacle block cost parameter, and a block weight coefficient, so as to select, based on the lane traffic efficiency, a lane for vehicle lane changing, wherein the lane traffic efficiency represents an expected smooth traffic condition when the traveling vehicle enters a lane, wherein the obstacle block cost parameter comprises a blocked cost parameter and a self-block cost parameter, and wherein, when executed by the one or more processors, the program instructions cause the determination device to perform:

determining the blocked cost parameter based on a difference between a third velocity of the different-lane leading vehicle and a fourth velocity of an associated leading vehicle, the associated leading vehicle being a vehicle in front of the different-lane leading vehicle; and determining the self-block cost parameter based on the third velocity, the fourth velocity, and a lane reference velocity, the lane reference velocity being determined based on a preset traveling velocity and a minimum lane velocity.

8. The determination device according to claim 7, wherein, when executed by the one or more processors, the program instructions cause the determination device to perform:

determining vehicle block efficiency based on a product of the vehicle block cost parameter and a first block weight coefficient;

calculating a first product of the blocked cost parameter and the first block weight coefficient and a first product of the self-block cost parameter and a second block weight coefficient respectively, and obtaining obstacle block efficiency based on a sum of the first products; and determining lane traffic efficiency based on a sum of the vehicle block efficiency and the obstacle block efficiency.

9. The determination device according to claim 8, wherein, when executed by the one or more processors, the program instructions cause the determination device to perform:

obtaining a first collision weight between the traveling vehicle and the same-lane leading vehicle and a second collision weight between the traveling vehicle and the different-lane leading vehicle; and calculating a second product of the vehicle block efficiency and the first collision weight and a second product of the obstacle block efficiency and the second collision weight respectively, and determining lane traffic efficiency based on a sum of the second products.

10. The determination device according to claim 9, wherein, when executed by the one or more processors, the program instructions cause the determination device to perform:

searching for all leading obstacle vehicles corresponding to a traveling position of the traveling vehicle; and determining a same-lane leading vehicle and a different-lane leading vehicle based on lane positions of the leading obstacle vehicles.

11. The determination device according to claim 10, wherein, when executed by the one or more processors, the program instructions cause the determination device to perform:

obtaining traveling state information of the traveling vehicle under a condition that vehicle collision time in a target lane selected based on the lane traffic efficiency matches reference collision time.

12. The determination device according to claim 11, wherein, when executed by the one or more processors, the program instructions cause the determination device to perform:

triggering a vehicle lane changing planning operation under a condition that the traveling state information does not match a lane change suppression strategy of the target lane.

13. The determination device according to claim 12, wherein, when executed by the one or more processors, the program instructions cause the determination device to perform:

starting a cooling timer for a lane change under a condition that the vehicle collision time in the target lane does not match the reference collision time or under a condition that the traveling state information matches the lane change suppression strategy of the target lane; and re-performing steps of determining obstacle vehicles in lanes corresponding to a traveling vehicle under a condition that the cooling timer reaches a preset cooling time interval.

14. A non-transitory storage medium readable storage medium, storing a program or an instruction, wherein, when the program or instruction is executed by a processor, steps in the determination method for vehicle traffic efficiency according to claim 1 are implemented.

* * * * *